United States Patent
Porterfield

(10) Patent No.: US 6,901,466 B2
(45) Date of Patent: *May 31, 2005

(54) APPARATUS FOR EXTENDING THE AVAILABLE NUMBER OF CONFIGURATION REGISTERS

(75) Inventor: A. Kent Porterfield, New Brighton, MN (US)

(73) Assignee: Micron Technology, Inc., Boise, ID (US)

( * ) Notice: Subject to any disclaimer, the term of this patent is extended or adjusted under 35 U.S.C. 154(b) by 281 days.

This patent is subject to a terminal disclaimer.

(21) Appl. No.: 09/878,616

(22) Filed: Jun. 12, 2001

(65) Prior Publication Data

US 2001/0029561 A1 Oct. 11, 2001

Related U.S. Application Data

(63) Continuation of application No. 09/619,597, filed on Jul. 19, 2000, now Pat. No. 6,272,576, which is a continuation of application No. 09/088,966, filed on Jan. 20, 1998, now Pat. No. 6,108,733.

(51) Int. Cl.[7] .............................................. G06F 12/00
(52) U.S. Cl. ................... 710/104; 710/8; 713/1
(58) Field of Search .............................. 710/8, 9, 10, 56, 710/104; 713/1, 2, 100; 709/1, 100, 104; 711/100, 170

(56) References Cited

U.S. PATENT DOCUMENTS

| | | |
|---|---|---|
| 4,382,278 A | 5/1983 | Appelt |
| 4,481,573 A | 11/1984 | Fukunaga et al. |
| 4,757,438 A | 7/1988 | Thatte et al. |
| 4,937,734 A | 6/1990 | Bechtolsheim |
| 4,969,122 A | 11/1990 | Jensen |
| 5,133,058 A | 7/1992 | Jensen |
| 5,222,222 A | 6/1993 | Mehring et al. |
| 5,265,227 A | 11/1993 | Kohn et al. |
| 5,321,807 A | 6/1994 | Mumford |
| 5,321,836 A | 6/1994 | Crawford et al. |
| 5,339,428 A | 8/1994 | Burmeister et al. |
| 5,426,750 A | 6/1995 | Becker et al. |
| 5,446,854 A | 8/1995 | Khalidi et al. |
| 5,446,869 A | 8/1995 | Padgett et al. |
| 5,465,337 A | 11/1995 | Kong |
| 5,471,601 A | 11/1995 | Gonzales |
| 5,479,639 A | 12/1995 | Ewertz et al. |
| 5,481,688 A | 1/1996 | Takagi |
| 5,519,876 A | 5/1996 | Byers et al. |
| 5,542,062 A | 7/1996 | Taylor et al. |
| 5,553,023 A | 9/1996 | Lau et al. |
| 5,568,619 A | 10/1996 | Blackledge et al. |
| 5,579,529 A | 11/1996 | Terrell et al. |
| 5,594,882 A | 1/1997 | Bell |
| 5,608,876 A | 3/1997 | Cohen et al. |
| 5,737,524 A | 4/1998 | Cohen et al. |
| 5,751,975 A | 5/1998 | Gillespie et al. |
| 5,787,246 A | 7/1998 | Lichtman et al. |
| 5,793,979 A | 8/1998 | Lichtman et al. |
| 5,799,203 A | 8/1998 | Lee et al. |
| 5,838,935 A | 11/1998 | Davis et al. |
| 5,848,249 A | 12/1998 | Garbus et al. |
| 5,889,970 A | 3/1999 | Horan et al. |
| 5,911,149 A | 6/1999 | Luan et al. |
| 5,928,338 A * | 7/1999 | Lawman ..................... 710/8 |
| 5,968,156 A | 10/1999 | Kim |
| 6,038,397 A | 3/2000 | Iwanishi et al. |
| 6,272,576 B1 * | 8/2001 | Porterfield .................. 710/104 |

* cited by examiner

Primary Examiner—Glenn A. Auve
(74) Attorney, Agent, or Firm—Dorsey & Whitney LLP

(57) ABSTRACT

A method for expanding the number of configuration registers available in a computer system. Unused configuration registers that correspond to non-existent functions are used for other purposes. Memory is configured to allow enumeration software to conclude that the non-existent functions do not in fact exist.

35 Claims, 9 Drawing Sheets

APPARATUS FOR EXTENDING THE AVAILABLE NUMBER OF CONFIGURATION REGISTERS

This application is a continuation of U.S. patent application Ser. No. 09/619,597, filed Jul. 19, 2000, now issued as a U.S. Pat. No. 6,272,576 B1, which is a continuation of U.S. patent application Ser. No. 09/088,966, filed Jan. 20, 1998, entitled METHOD FOR EXTENDING THE AVAILABLE NUMBER OF CONFIGURATION REGISTERS, now U.S. Pat. No. 6,108,733.

FIELD OF THE INVENTION

The present invention relates generally to techniques for increasing the number of user-definable configuration registers available in a computer system. More particularly, the present invention relates to a procedure for making unused configuration memory space available for use as configuration registers.

BACKGROUND OF THE INVENTION

In computer systems employing the commonly-used Peripheral Component Interconnect (PCI) bus, the PCI architecture makes available configuration registers that can be used for implementing various logic and control functions. The configuration registers are typically programmed and accessed by the device that implements a particular function or feature. Often, the number of configuration registers available is sufficient for a given programming task. However, for implementations of some tasks, the number of configuration registers is too small, making PCI configuration registers a scarce resource. Increasing the number of PCI configuration registers is difficult, however, because the PCI standard requires that configuration registers be addressed in a specified manner, and conform to requirements of other software and hardware. Thus, there exists a need for an effective method for increasing the number of available configuration registers, while also maintaining compatibility with applicable bus standards or other standards.

SUMMARY OF THE INVENTION

The present invention relates to techniques for increasing the number of user-definable configuration registers, such as in a PCI-based computer system. In some embodiments, the present invention uses a non-existent device function to provide additional user definable configuration registers, while still maintaining compatibility with applicable standards or conventions.

In one embodiment of the invention, the invention relates to a computer comprising: (a) a processor; (b) a PCI bus attached to the processor through bridge logic; (c) configuration memory space that is accessible to the processor and that is allocated for devices attached to the PCI bus, wherein each PCI device has configuration space allocated for a plurality of functions; and (d) a PCI device attached to the PCI bus that has memory allocated in the configuration memory space for a first function for the PCI device and for a second function for the PCI device. The PCI device includes hardware for carrying out the first function, where the hardware for carrying out the first function accesses (i) configuration registers in the configuration memory space that corresponds to the first function and also (ii) configuration registers in the configuration memory space that corresponds to the second function.

In another embodiment of the present invention, the present invention relates to a method of configuring and using a device, where the device has configuration memory space allocated to it for a plurality of functions. At least one of the plurality of functions is implemented by the device, and at least one of the plurality of functions is not implemented by the device. The method comprises the acts of: (a) storing data in a header portion of the configuration space allocated to the function that is not implemented by the device, wherein the data indicates that the function is not implemented; (b) programming a register that is in the remaining portion of the configuration space allocated to the function that is not implemented by the device; and (c) accessing the programmed register.

Additional embodiments and features, and the nature of the present invention may be more clearly understood by reference to the following detailed description of the invention, the appended claims, and to the several drawings herein.

DETAILED DESCRIPTION OF THE INVENTION

The present invention is described herein in terms of a PCI-based computer system, but it should be understood that the techniques and procedures disclosed herein can be applicable to other systems and architectures. Not all embodiments of the present invention are limited to an implementation based on the Peripheral Component Interconnect architecture.

Figure 1:
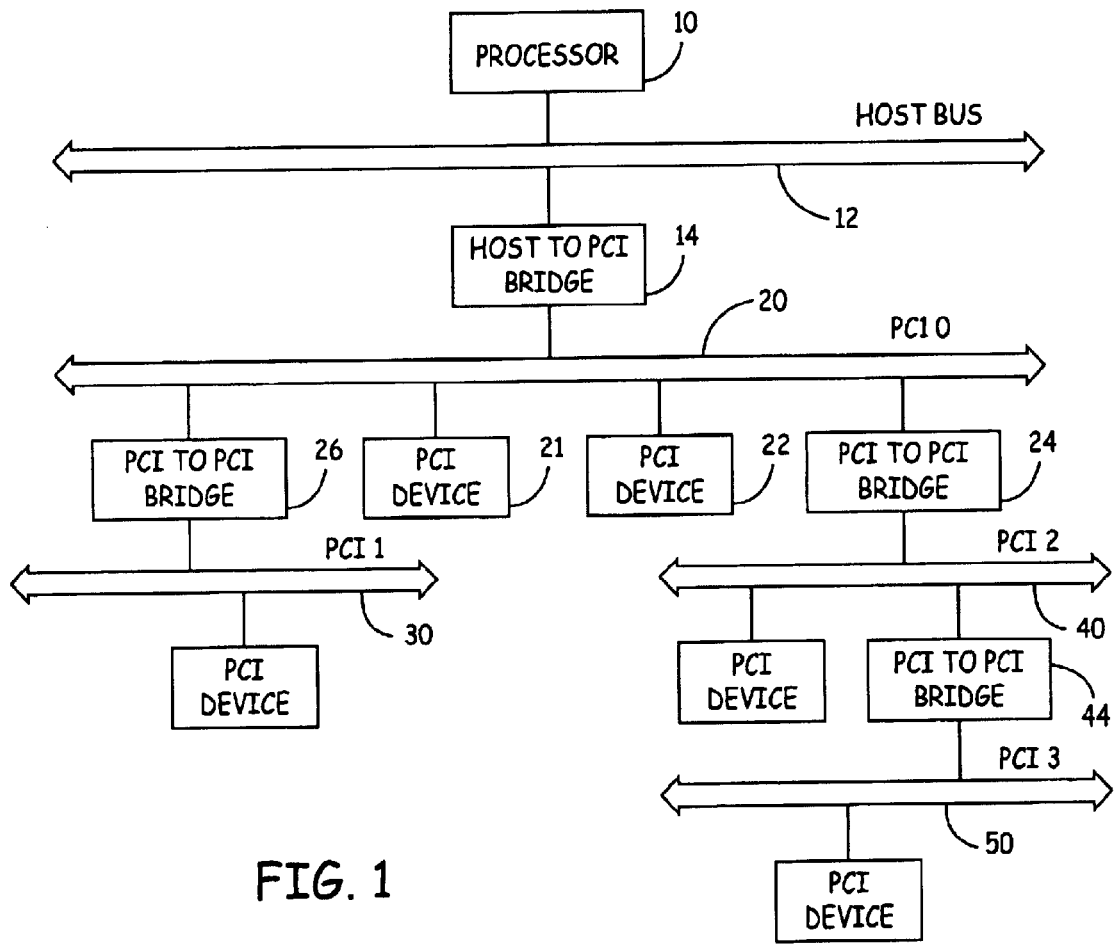
FIG. 1 is a block diagram of a computer system including multiple PCI buses and a number of PCI devices on the PCI busses.

FIG. 1 is a block diagram of a hierarchical PCI-based computer system having a processor 10 attached to a host bus 12. A host to PCI bridge 14 connects the host bus to a first PCI bus 20, which has attached to it PCI devices 21, 22. PCI to PCI bridge logic 24 and 26 connects the PCI bus 20 to two additional PCI busses 30 and 40. A fourth PCI bus 50 is attached to the PCI bus 40 through bridge logic 44. As shown in FIG. 1, a number of PCI busses can be implemented in a hierarchical or non-hierarchical manner within a computer system.

Figure 2:
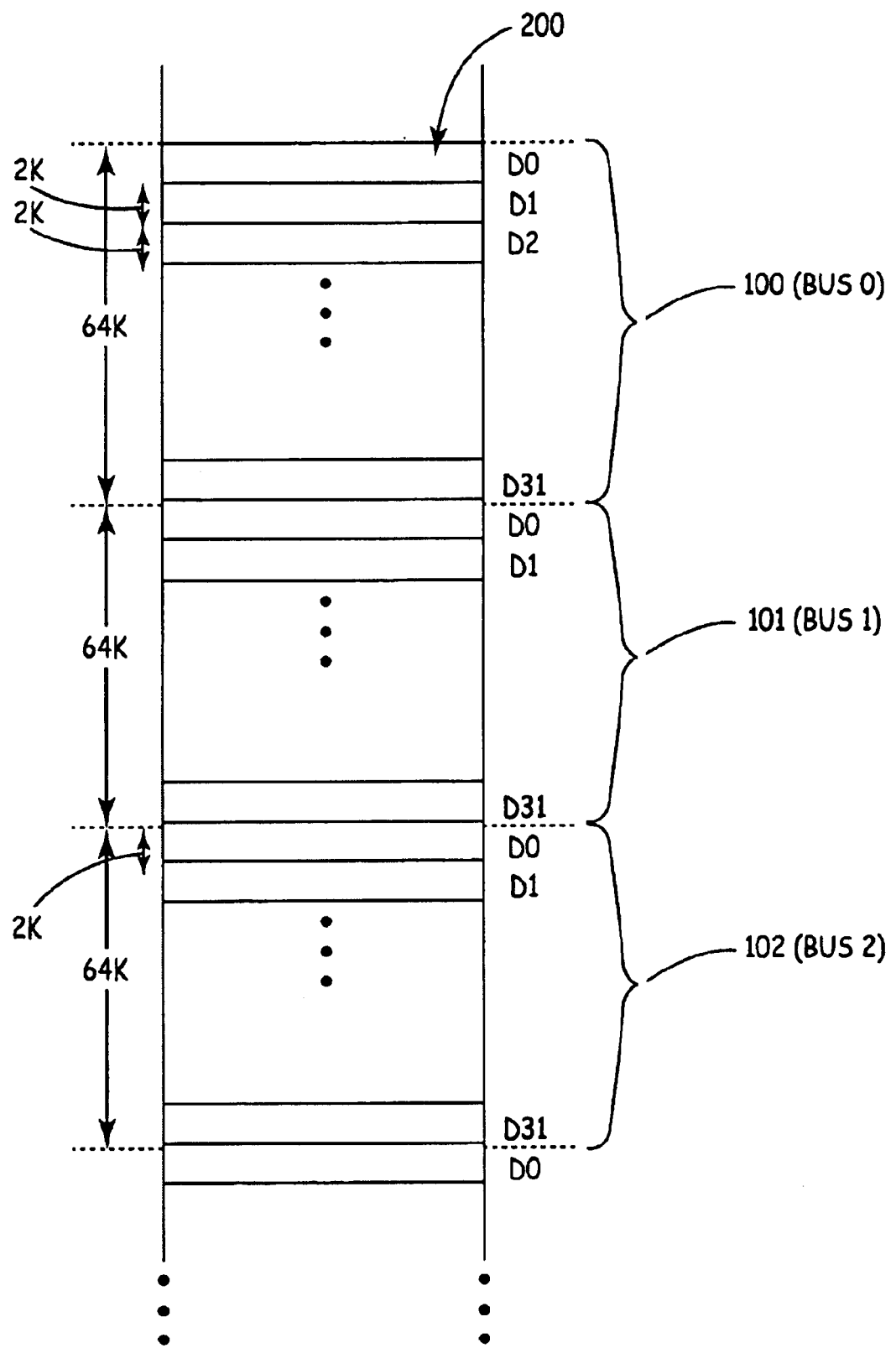
FIG. 2 is a memory map of the PCI memory space in a system such as that shown in FIG. 1.

Each bus within the computer system is allocated an amount of memory within the PCI configuration space, a representation of which is shown in FIG. 2. The memory map of FIG. 2 shows a typical PCI configuration space for a system such as that of FIG. 1, where each bus is allocated 64 kilobytes of PCI configuration space. Bus 0, for example, is allocated the 64 kilobytes of configuration space indicated by the reference numeral 100. Bus 1 is allocated the 64 kilobytes of configuration space indicated at 101. In the embodiment of FIG. 2, within the configuration space allocated for each bus, a 2 kilobyte configuration space is allocated for each of 32 devices. For example, device 0 on bus 0 is allocated the 2 kilobyte configuration space 200 in FIG. 2.

Figure 3:
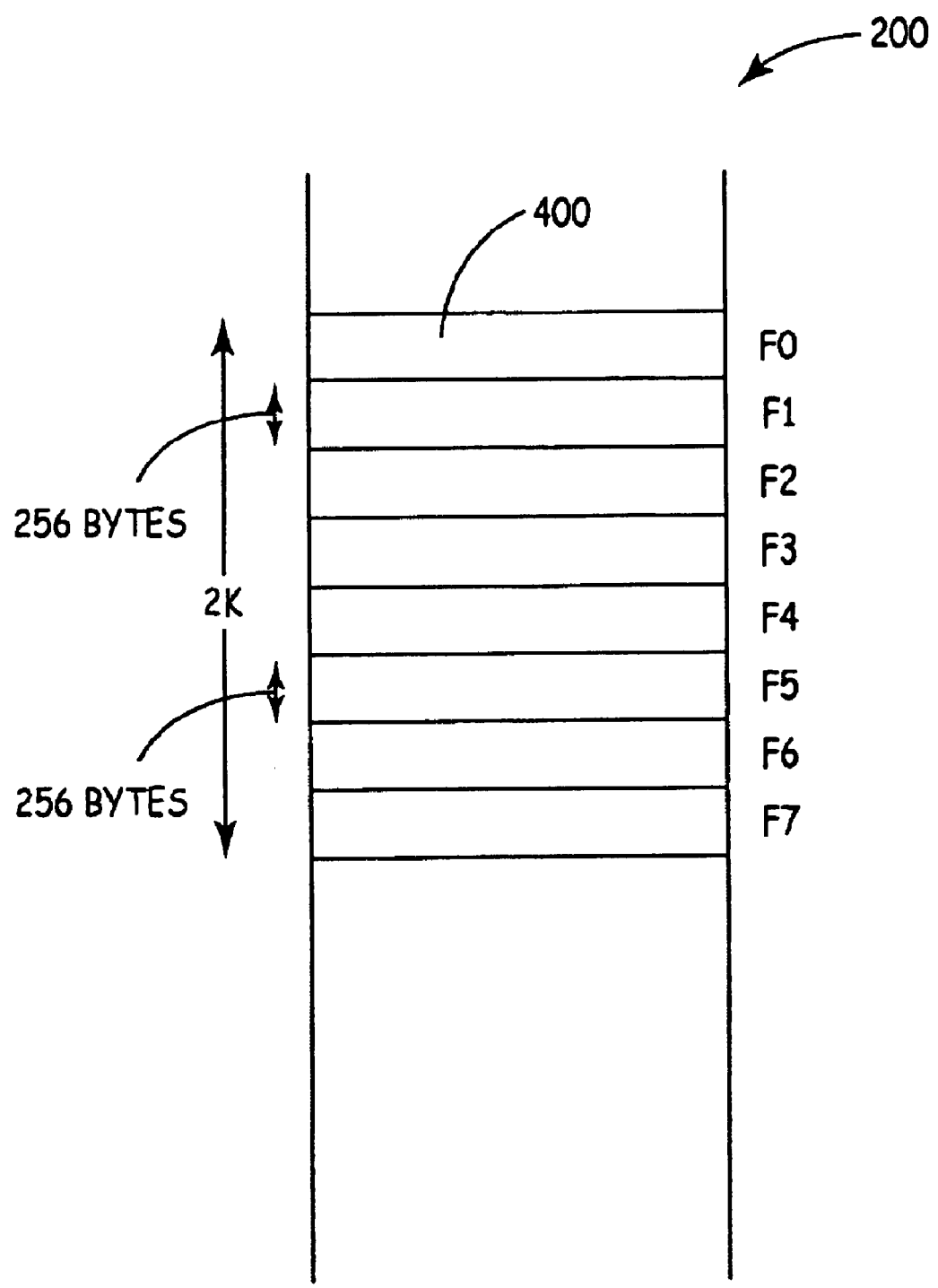
FIG. 3 is a memory map of a portion of the memory map of FIG. 2, wherein the memory space for a particular device is shown.

FIG. 3 is a representation of the device configuration space 200 from FIG. 2. Within the 2 kilobyte device space 200, configuration space is allocated for each of eight functions for the device that corresponds to the device space 200. Some devices may have multiple functions, such as when a device has both video and audio capabilities. Often, however, devices have only a single function. But in the embodiment of FIG. 2, configuration space is allocated for eight functions for each device, even if one or more devices implement less than eight functions. Each of the eight possible functions for a given device is allocated a 256 byte configuration space. FIG. 3 shows the configuration space 400 for function 0 corresponding to the device space 200.

Figure 4:
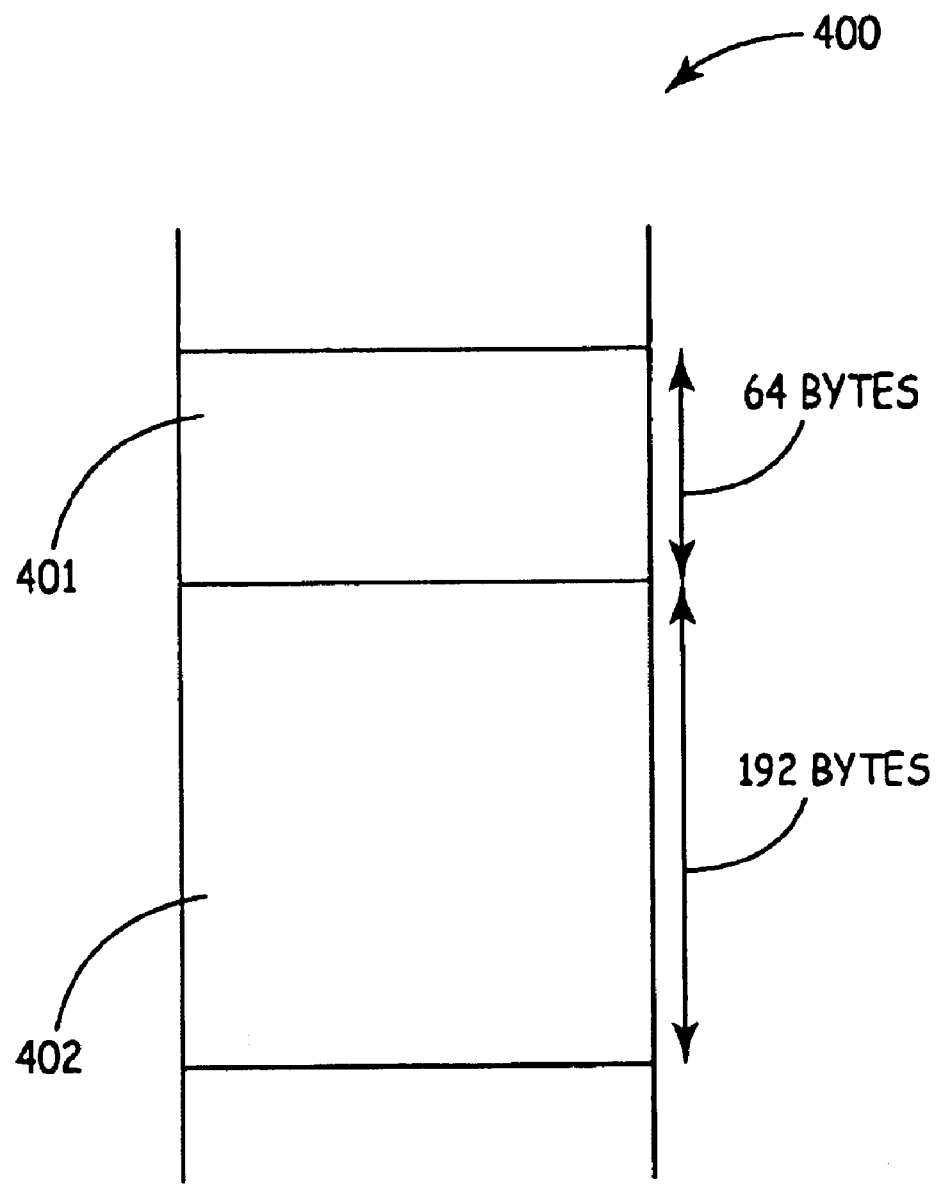
FIG. 4 is a memory map of a configuration space header and the associated configuration registers for a particular function in a given device.

In FIG. 4, the configuration space 400 for function 0 is illustrated. As shown this 256 byte configuration space is made up of a 64 byte header portion 401, and a 192-byte portion 402 that includes that function's configuration registers. These configuration registers are used and/or programmed by device driver software.

Figure 5:
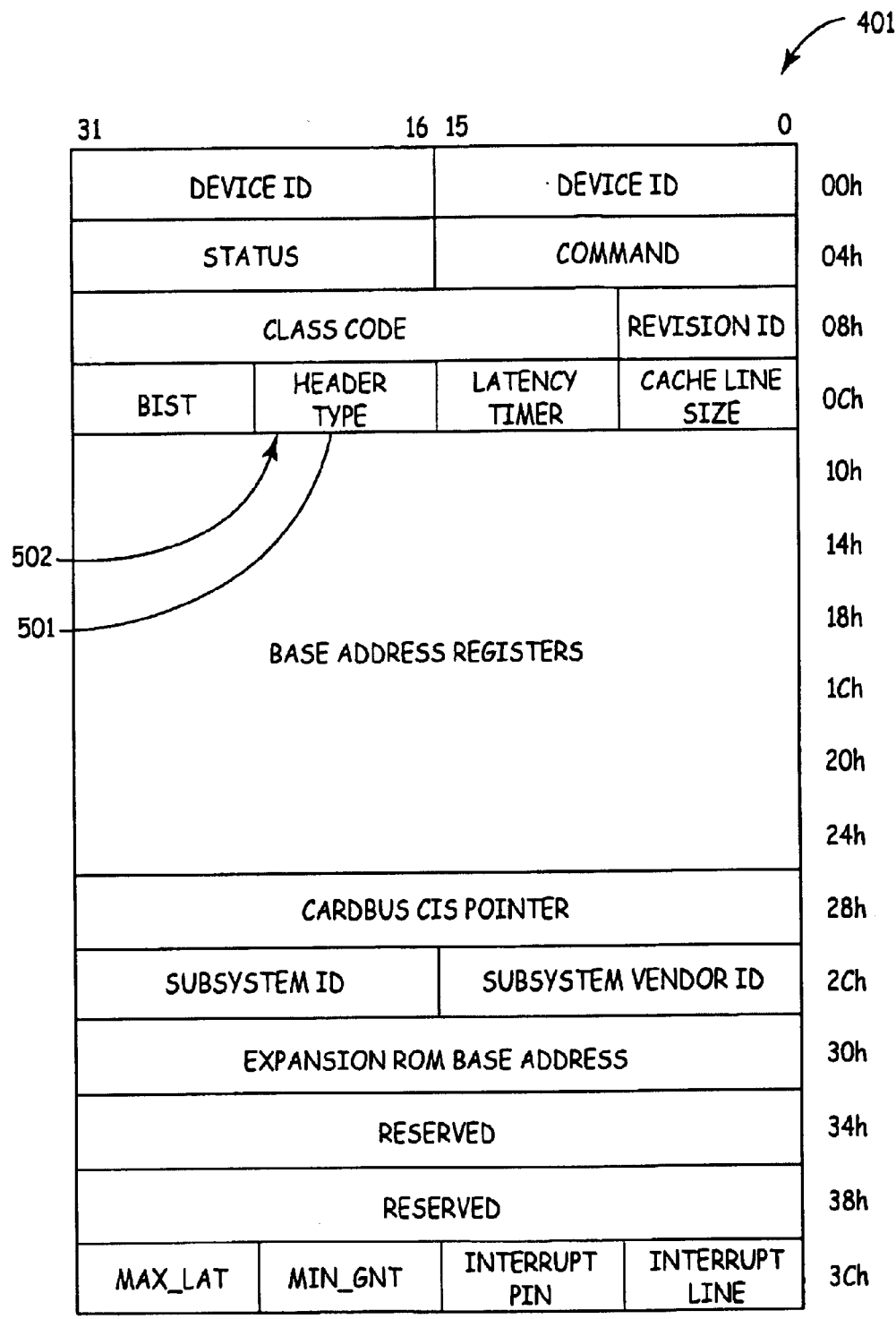
FIG. 5 is a more detailed memory map of the configuration space header of FIG. 4, showing the configuration space header for a particular function in a given device.

The 64 byte header portion 401 of the 256 byte function configuration space is shown in FIG. 5. The header portion of the function configuration space for each function is, in one embodiment, fixed as shown in FIG. 5. As shown in FIG. 5, the header includes areas in which the device ID, the vendor ID, the header type, and other information may be stored. The definition allows, among other things, enumeration software (e.g., "Plug and Play" software) to identify, access, and program certain system resources.

Figure 6:
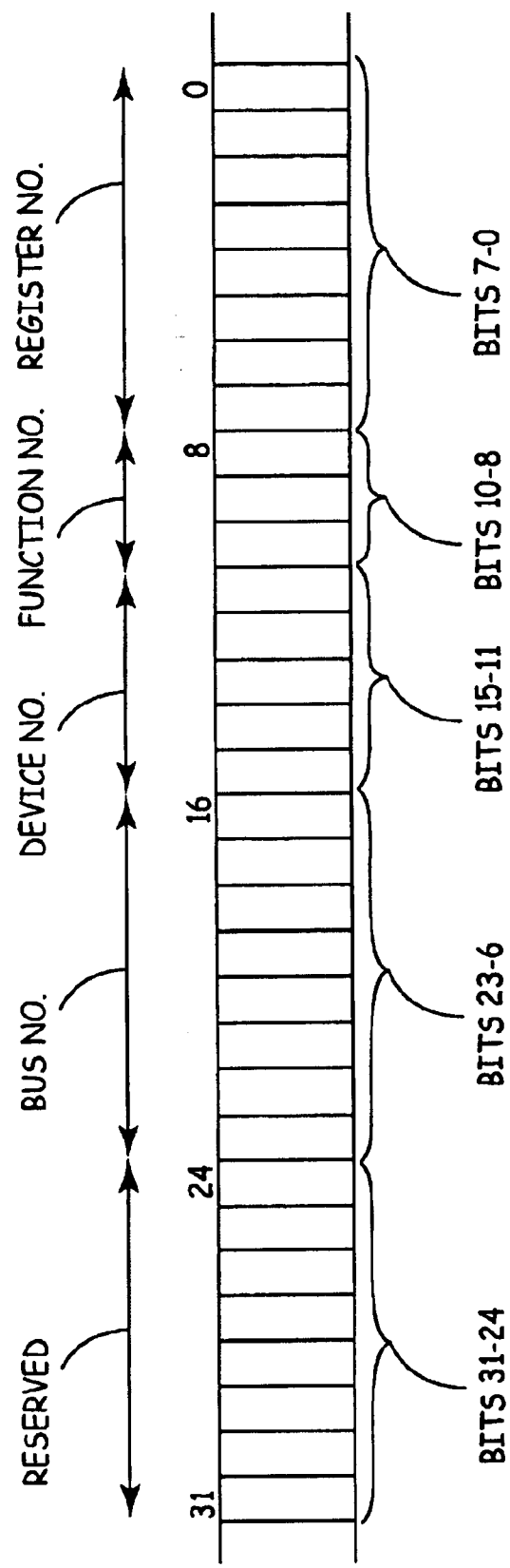
FIG. 6 is a representation of the configuration address for a PCI bus, showing the hierarchical manner in which busses, devices, functions, and registers are addressed.

FIG. 6 is a diagram of the configuration address that can be used to address the PCI configuration space. An eight-bit portion of the configuration address, bits 23 to 16, are used to address the portion of configuration space that corresponds to a particular bus within the computer system. The five bits 15 to 11 address a particular device on the addressed bus, and the three bits 10 to 8 address a particular function on the addressed device. The eight bits 7 to 0 address the desired configuration register within the addressed function.

In operation, enumeration software, such as plug-and-play software, accesses portions of the configuration space in order to determine what types of devices are available in the computer system. The enumeration software may also determine how many functions each device supports. As described above, some devices may support only a single function, whereas other devices may support multiple functions. Typically, the number of functions supported by a particular device can be determined by accesing the configuration space header for one or more of the device's functions.

When enumeration software accesses the configuration space in a PCI-based system, it determines the number of functions each device supports by accessing the configuration space headers for at least one function for that device. Specifically, for each device on each bus, it may test the header type field 501 within function 0 for each device to determine if the device corresponding to the configuration header being accessed is a multi-function device. This is determined in a PCI-based system by testing the bit 502 of the configuration register 501 shown in FIG. 5. This is bit 7 of the configuration register 0×10 within the configuration space header for function 0. See Section 6.2.1 of the PCI Specification, Revision 2.1.

If the device is not a multi-function device, the enumeration logic does not scan the configuration space header for the remaining functions. Rather it assumes that the only function implemented by the device is function 0, and it assumes that remaining functions 1 to 7 do not exist or are not implemented.

If, however, the device is a multi-function device, enumeration software scans the configuration space header for each of the eight functions that the device may have. Each configuration space header that corresponds to a non-existent function will not respond to the cycle in which that function is being accessed. Thus, the access will end in a master abort, which returns all logic 1s. When enumeration software receives all logic 1s, it concludes that the function does not exist. In this way, enumeration software determines the existence, or non-existence of a device function in a multi-function device by reading the configuration header for each function. If the configuration header returns all logic 1s, the function does not exist. If the configuration header returns anything else, the addressed function does exist.

The number of user-definable configuration registers can be effectively increased by using the configuration registers for a non-existent function. In some embodiments, the present invention will maintain compatibility with the PCI standard, and enumeration software will still operate in the manner described above. Because enumeration software will conclude that a function does not exist if the configuration space header for that non-existent function returns all logic 1s, enumeration software will still operate correctly simply by setting every bit in the configuration space header to logic 1. The remaining portion of the configuration space for that function can then safely be used as additional configuration registers by a device-specific device driver. The device driver or other software that needs scarce configuration registers will be aware of the additional configuration registers, but these registers will effectively be hidden from enumeration software.

Figure 7:
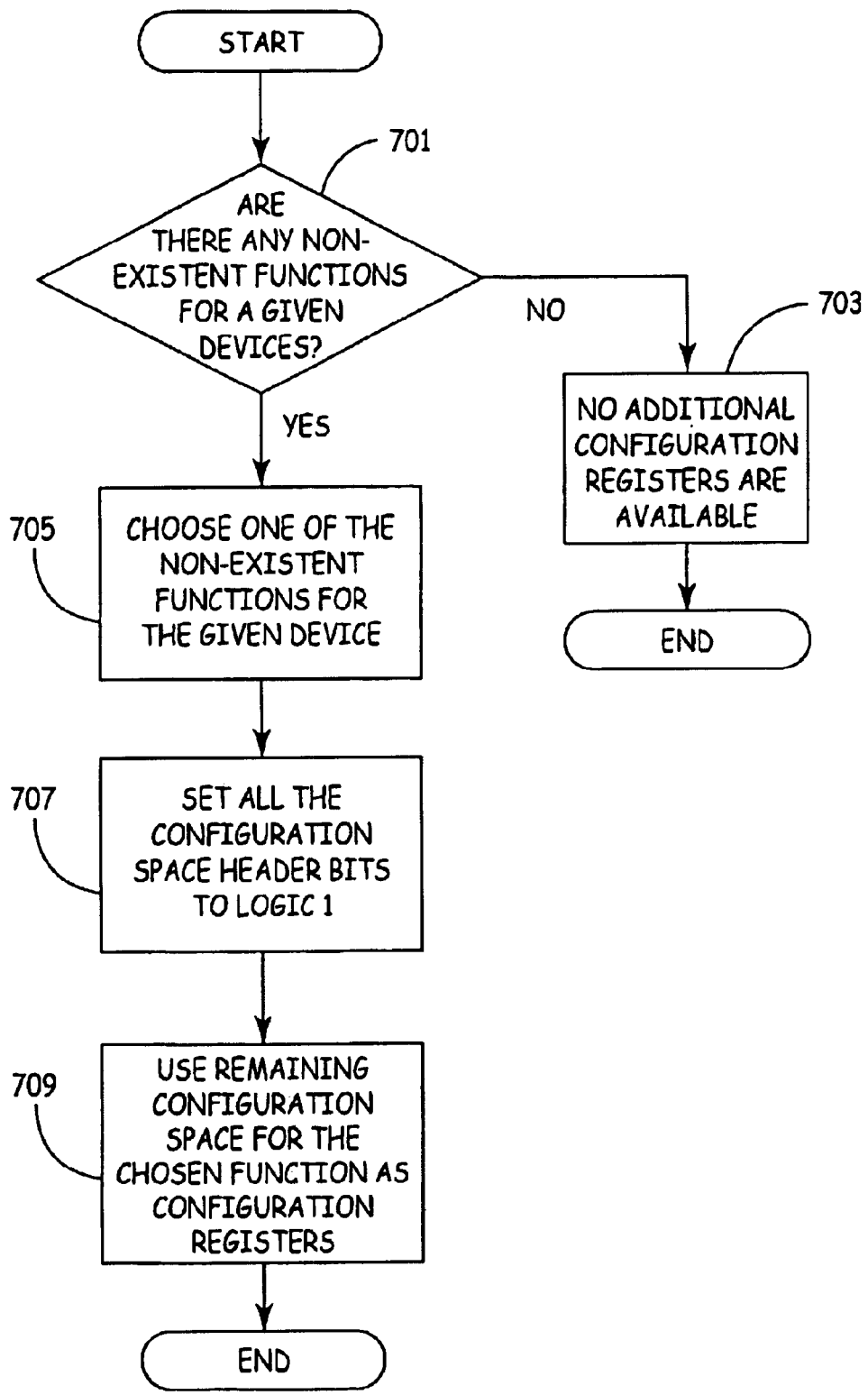
FIG. 7 is a flow chart illustrating a process for expanding the number of user-definable configuration registers.

FIG. 7 is a flow chart of a process used during design in one embodiment of the present invention to expand the available number of user-definable configuration registers within a system. At 701 the device configuration space is checked for a given device to determine whether there are any non-existent functions for the device. If there are no non-existent functions, then the embodiment of the invention illustrated in FIG. 7 yields no additional configuration registers from this particular device configuration space. If, however, there are non-existent functions for the device, then one or more is chosen at 705. For each chosen function, the configuration space header bits are programmed to be set to logic 1 when they are accessed by enumeration software. The remaining portion of the configuration space for the non-existent function can then be used for additional configuration registers at 709.

Figure 8:
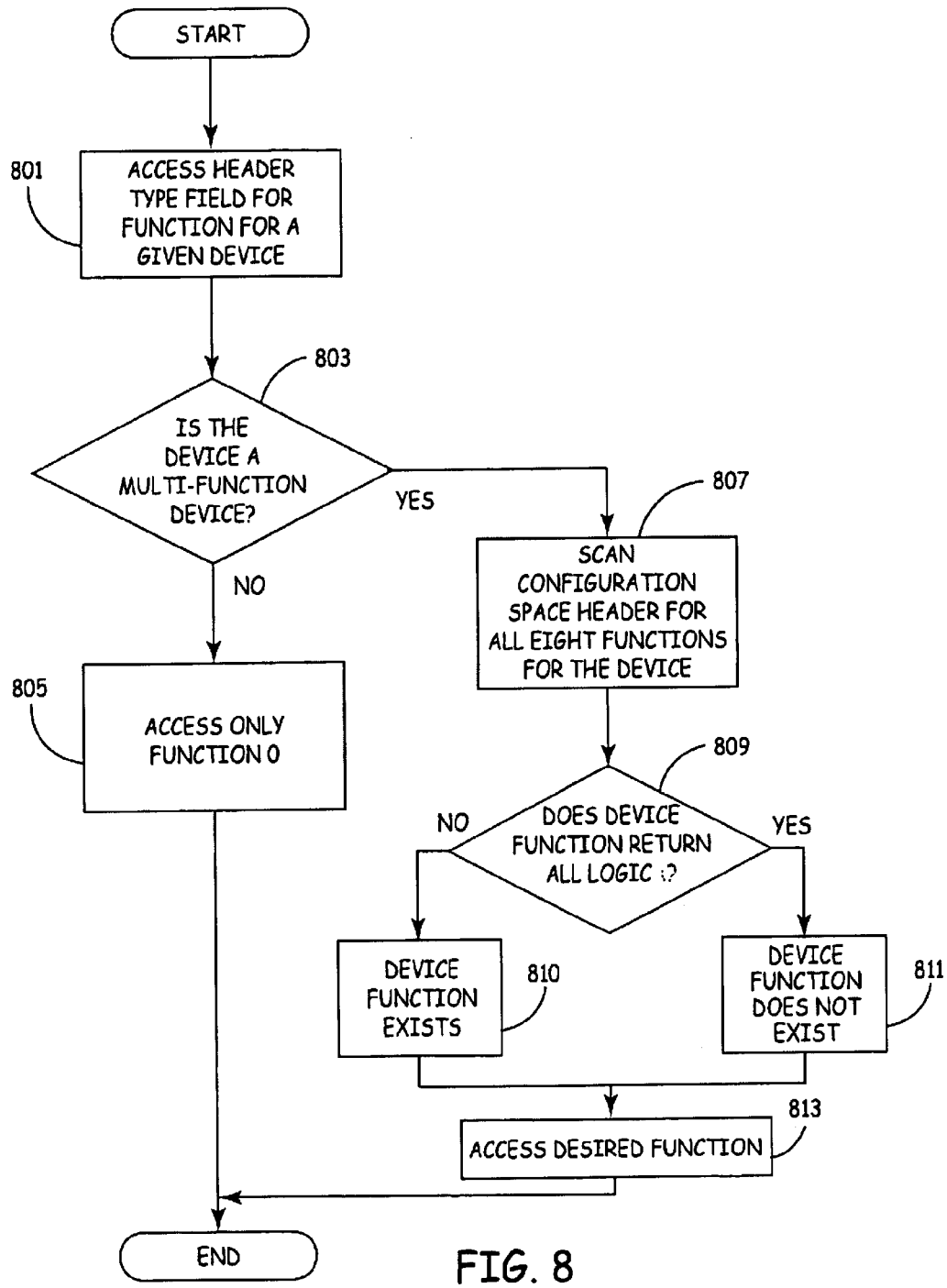
FIG. 8 is a flow chart illustrating a process carried out by enumeration software.

The device implemented by the process illustrated in FIG. 7 will still maintain compatibility with enumeration software, as can be demonstrated by the flow chart of FIG. 8. FIG. 8 is a flow chart of the process carried out by enumeration software when it accesses configuration space for a given device. At 801 the enumeration software accesses the header type field for the first function for a given device. This type field indicates whether the device is a multi-function device or not. If at 803 it is determined that the device is not a multi-function device, then the enumeration software accesses function 0 at 805, and does not bother accessing any of the other possible functions.

If the device is determined at 803 to be a multi-function device, then the configuration space header for each of the remaining functions for that device is scanned at 807. If, for each of those functions, the configuration space header returns all logic 1s at 809, then the enumeration software concludes that the addressed function does not exist. For those functions that do not return all logic 1s, the function does exist, and can be accessed by the enumeration software at 809.

The use of non-existent device functions for additional configuration out by enumerations software. Thus, enumeration software will continue to work properly in a device implemented in accordance with the present invention. In some embodiments of the present invention, even configuration space headers can be used as additional configuration registers when the device has only a single function. With a single-function device, the enumeration software will only scan the configuration space header for function 0. This makes it unnecessary to configuration space headers for functions 1 to 7 to return logic 1s when accessed. Thus, these configuration space headers can also be used as configuration registers in a single-function device.

Figure 9:
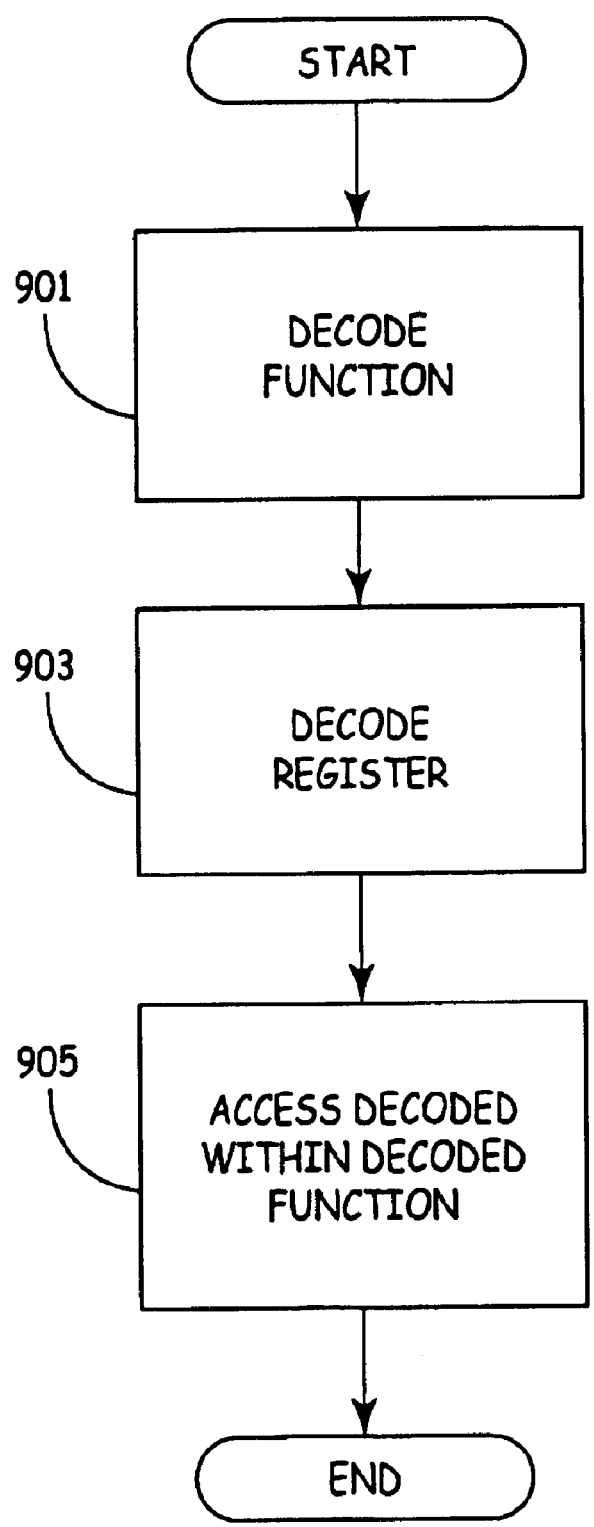
FIG. 9 is a flow chart illustrating a process for accessing user-definable configuration registers in an embodiment of the present invention.

FIG. 9 is a flow chart of the process carried out by a device driver to access configuration registers, including those made available through use of configuration space corresponding to non-existent device functions. The device driver knows of the existence of the configuration registers that are hidden from the enumeration software, and configuration registers made available through nonexistent functions are accessed in a manner similar to that in which conventional configuration registers are accessed. FIG. 9 illustrates a process for accessing these additional configuration registers. The configuration space address is decoded to determine the addressed function at 901, and also decoded to determine the addressed register at 903 within the configuration space for the addressed function. Once this decoding is complete, the decoded register can be accessed at 905. This access may even be to a function that does not correspond to the function that is currently being used or is currently implicated.

In another embodiment, and for an additional level of security, it may be useful to include a stealth bit in the function 0 user definable configuration space for each device. When the stealth bit is set, even the upper 192 bits of the non-existent function would return logic Is when they are read, and they would also be write-protected. protected. When such a stealth bit mode is enabled, the configuration registers in the non-existent function would not be used.

The present invention can be used to expand the number of configuration registers available in a system that implements a bus-parking diagnostic technique, such as that disclosed in co-pending and commonly-assigned application Ser. No. now issued as U.S. Pat. No. 6,092,219.

Although the present invention has been described in terms of certain embodiments, various changes and modifications, even if not shown or specifically described herein, are deemed to lie within the spirit and scope of the invention and the appended claims.

What is claimed is:

1. A computer system having at least one device connected to a bus and having configuration memory space for allocation to devices, comprising:
   a device configuration space allocated for the at least one device in the configuration memory space, said device configuration space having one or more function configuration spaces associated with one or more functions implementable in the at least one device, each function configuration space having a header and at least one configuration register;
   an indicator field in the device configuration space to indicate that at least one function implementable in the at least one device is not actually implemented; and
   at least one configuration register in the function configuration space associated with the at least one function that is not actually implemented being accessed for a purpose other than the associated function not actually implemented.

2. The system of claim 1 wherein the indicator field is in the header of the function configuration space for the at least one function not actually implemented.

3. The system of claim 1 wherein the device configuration space has function configuration space for a first function that is implemented as well as for the at least one function not actually implemented and the indicator field is in the function configuration space for the first function.

4. The system of claim 1 further comprising a device driver that addresses at least one configuration register in the function configuration space associated with the at least one function that is not actually implemented.

5. The system of claim 1 further comprising enumeration software programmed to check the device configuration space for the at least one device but inhibited from using any configuration registers in a function configuration space that is associated with a function not actually implemented.

6. The system of claim 1 wherein the device configuration space has function configuration space for a plurality of functions that are not implemented and the indicator field indicates that more than one of the plurality of functions is not actually implemented, further comprising at least one configuration register in each function configuration space for one of the plurality of associated functions not actually implemented being accessed for a purpose other than the associated function not actually implemented.

7. The system of claim 6 wherein the system further comprises enumeration software programmed to check the device configuration space to identify functions not actually implemented but inhibited from using any configuration registers in a function configuration space that is associated with a function not actually implemented.

8. The system of claim 6 wherein the device configuration space has function configuration space for a first function that is implemented as well as for the plurality of functions not actually implemented and the indicator field for all functions not actually implemented is in the function configuration space for the first function.

9. The system of claim 1, wherein the at least one device is a multifunction device, having a first function and a plurality of additional functions, wherein the indicator field to indicate that at least one function implementable in the at least one device is not actually implemented provides an indication that the device is a multifunction device and that the plurality of additional functions is not implemented.

10. The system of claim 9 further comprising enumeration software that checks the function configuration space for the first function of the at least one device but is inhibited from checking any other function configuration spaces, when the function configuration space for the first function indicates that the device is a multifunction device and that the plurality of additional functions is not implemented.

11. A system for providing additional configuration registers to a device used in a system having at least one device connected to a bus and having configuration memory space for allocation to devices, comprising:

a device configuration space allocated for the at least one device in the configuration memory space, said device configuration space having one or more function configuration spaces associated with one or more functions implementable in the at least one device, each function configuration space having a header and configuration registers;

a data field in the device configuration space for data to implement a first function and an indicator field indicating that a second function implementable in the at least one device is not actually implemented; and software programmed to address the configuration registers in the function configuration space for the second function that is not actually implemented as additional configuration registers for the first function.

12. The system of claim 11 wherein the software programmed to address the configuration registers uses them as additional configuration registers for a device driver.

13. The system of claim 11 wherein the indicator field is in the header of the function configuration space for the second function.

14. The system of claim 11 wherein the indicator field is in the function configuration space for the first function.

15. The system of claim 11 further comprising enumeration software that checks the device configuration space for the at least one device but is inhibited from using any configuration register in a function configuration space that is associated with a function not actually implemented.

16. The system of claim 11 wherein the device configuration space has function configuration space for a plurality of functions that are not implemented and the indicator field indicates that more than one of the plurality of functions is not actually implemented, further comprising a component permitting at least one configuration register in each function configuration space for one of the plurality of associated functions not actually implemented to be addressed as an additional user configuration register for the first function.

17. The system of claim 16 further comprising enumeration software that checks the function configuration space for the plurality of functions not actually implemented but is inhibited from using any configuration registers in function configuration space that is associated with functions not actually implemented.

18. The system of claim 16 wherein the indicator field for all functions not actually implemented is in the function configuration space for the first function.

19. The system of claim 11, wherein the at least one device is a multifunction device, having a plurality of additional functions in addition to the first function, and wherein the indicator field for indicating that the second function is not actually implemented provides an indication that the device is a multifunction device and that the plurality of additional functions is not implemented.

20. The system of claim 11, wherein the software is programmed to address at least one additional configuration register for use as an additional user configuration register.

21. A system for making additional configuration registers available, said system having at least one device connected to a bus and having configuration memory space for allocation to devices, comprising:

a device configuration space allocated for the at least one device in the configuration memory space, said device configuration space having one or more function configuration spaces associated with one or more functions implementable in the at least one device, each function configuration space having at least one configuration register;

a data field in the device configuration space for data to implement a first function and an indicator field for indicating that a second function implementable in the at least one device is not actually implemented; and a component for causing the at least one device to address at least one configuration register in the function configuration space for the second function that is not actually implemented as an additional configuration register for the first function.

22. The system of claim 21 wherein the component for causing the at least one device to address at least one configuration register comprises hardware in the at least one device configured to access the additional configuration register.

23. The system of claim 21 wherein the component for causing the at least one device to address at least one configuration register comprises device driver software programmed to access the at least one additional configuration register.

24. The system of claim 21 wherein the indicator field is in a header of the function configuration space for the second function.

25. The system of claim 21 wherein the indicator field is in the function configuration space for the first function.

26. The system of claim 21 further comprising enumeration software that checks the device configuration space for the device, and, if the enumeration software finds a function does not exist, makes accessible to the at least one device at least one configuration register in a function configuration space associated with the function found not to exist.

27. The system of claim 21 wherein the device configuration space has function configuration space for a plurality of functions that are not implemented and the indicator field indicates that more than one of the plurality of functions is not actually implemented, further wherein the component for causing the at least one device to address at least one configuration register causes the at least one configuration register to be addressed as an additional user configuration register for the first function.

28. The system of claim 21 wherein the at least one device is a PCI device and the component for causing the at least one device to address at least one configuration register comprises hardware that carries out the first function in the PCI device and addresses configuration registers in function configuration space that is associated with each of the first function and the second function.

29. The system of claim 21 wherein the device configuration space has function configuration space for a plurality of functions not actually implemented and an indicator field for all functions not actually implemented is in the function configuration space for the first function.

30. The system of claim 21, wherein the at least one device is a multifunction device, having a set of N additional functions in addition to the first function, wherein the indicator field for indicating that the second function is not actually implemented provides an indication that the device is a multifunction device and that one or more of the set of N additional functions is not implemented.

31. The system of claim 30 further comprising enumeration software, that checks the device configuration space for implemented functions of the at least one device by reading a configuration header for each function.

32. A device for use in a computer system having at least one device connected to a bus and having configuration memory space for allocation to devices, comprising:
- a component for accessing a device configuration space allocated to the device in the configuration memory space, said device configuration space having one or more function configuration spaces associated with one or more functions implementable in the at least one device, each function configuration space having at least one configuration register;
- a component for accessing an indicator field for indicating that at least one function implementable in the at least one device is not actually implemented; and
- a component configured to address the function configuration space for the at least one function that is not actually implemented as additional function configuration space for the device.

33. The device of claim 32 wherein the additional function configuration space to be addressed includes function configuration space normally allocated for configuration registers.

34. The device of claim 32 wherein the additional function configuration space to be addressed includes function configuration space not normally allocated for a header.

35. The device of claim 32 wherein the additional function configuration space addressed includes function configuration space normally allocated for both a header and configuration registers.

* * * * *